US010313382B2

(12) United States Patent
Noel et al.

(10) Patent No.: US 10,313,382 B2
(45) Date of Patent: Jun. 4, 2019

(54) SYSTEM AND METHOD FOR VISUALIZING AND ANALYZING CYBER-ATTACKS USING A GRAPH MODEL

(71) Applicant: The MITRE Corporation, McLean, VA (US)

(72) Inventors: Steven Noel, Woodbridge, VA (US); Eric Harley, Baltimore, MD (US); Kam Him Tam, Oakton, VA (US); Michael Limiero, Washington, DC (US); Matthew Share, Arlington, VA (US)

(73) Assignee: The MITRE Corporation, McLean, VA (US)

( * ) Notice: Subject to any disclaimer, the term of this patent is extended or adjusted under 35 U.S.C. 154(b) by 35 days.

(21) Appl. No.: 15/084,153

(22) Filed: Mar. 29, 2016

(65) Prior Publication Data
US 2017/0289187 A1    Oct. 5, 2017

(51) Int. Cl.
*H04L 29/06*   (2006.01)
*G06F 16/901*  (2019.01)
(Continued)

(52) U.S. Cl.
CPC .......... *H04L 63/1433* (2013.01); *G06F 16/28* (2019.01); *G06F 16/9024* (2019.01);
(Continued)

(58) Field of Classification Search
None
See application file for complete search history.

(56) References Cited

U.S. PATENT DOCUMENTS 8,191,149 B2   5/2012   Yun et al.
8,566,269 B2   10/2013  Jajodia et al.
(Continued)

FOREIGN PATENT DOCUMENTS

WO   WO-2015/134008 A1   9/2015

OTHER PUBLICATIONS

Jakobson, Gabriel. "Mission-Centricity in Cyber Security: Architecting Cyber Attack Resilient Missions," *2013 5th International Conference on Cyber Conflict*, Jun. 4-7, 2013, Princeton, New Jersey; pp. 1-18.
(Continued)

*Primary Examiner* — Trang T Doan
(74) *Attorney, Agent, or Firm* — Morrison & Foerster LLP

(57) ABSTRACT

A system and method for implementing a graph database to analyze and monitor a status of an enterprise computer network is provided. In one example, a plurality of sensors can be inputted into sensor interface in which all of the data associated with the sensors in converted into a common data format. The data can be parsed into a data model that contains nodes and edges in order to generate a graph database model that can allow a network analyst to analyze the real-time status of a computer network. The graph database model can include multiple layers including an infrastructure layer, a cyber threats layer, a cyber posture layer, and a mission readiness layer. The graph database model can also be queried by a user using a domain-specific query language, so as to provide a user-friendly syntax in generating queries.

30 Claims, 11 Drawing Sheets

(51) Int. Cl.
    *H04L 29/08*      (2006.01)
    *G06F 21/57*      (2013.01)
    *G06F 16/28*      (2019.01)

(52) U.S. Cl.
    CPC .......... *G06F 21/577* (2013.01); *H04L 63/145* (2013.01); *H04L 67/12* (2013.01); *H04L 67/2823* (2013.01); *H04L 67/42* (2013.01); *G06F 2221/034* (2013.01)

(56) References Cited

U.S. PATENT DOCUMENTS

| | | | |
|---|---|---|---|
| 8,881,288 B1 | 9/2014 | Levy et al. | |
| 9,330,138 B1* | 5/2016 | Shankar | G06F 16/2452 |
| 9,516,053 B1* | 12/2016 | Muddu | G06F 16/254 |
| 9,609,011 B2* | 3/2017 | Muddu | G06F 16/254 |
| 2007/0209075 A1* | 9/2007 | Coffman | H04L 63/14 726/23 |
| 2007/0226796 A1* | 9/2007 | Gilbert | G06F 21/55 726/22 |
| 2012/0084860 A1* | 4/2012 | Cao | H04L 63/1441 726/23 |
| 2013/0124574 A1* | 5/2013 | Brettin | G06F 19/28 707/798 |
| 2014/0280361 A1* | 9/2014 | Aliferis | G06F 16/28 707/798 |
| 2014/0337974 A1 | 11/2014 | Joshi et al. | |
| 2015/0264077 A1 | 9/2015 | Berger et al. | |
| 2015/0278396 A1* | 10/2015 | Vasilyeva | G06F 16/9024 707/769 |
| 2015/0295948 A1 | 10/2015 | Hassell et al. | |
| 2015/0347480 A1* | 12/2015 | Smart | G06F 16/2264 707/743 |
| 2015/0381649 A1 | 12/2015 | Schultz et al. | |
| 2016/0028758 A1* | 1/2016 | Ellis | G06F 21/52 726/25 |
| 2016/0065597 A1* | 3/2016 | Nguyen | H04L 63/1441 726/22 |
| 2016/0065610 A1* | 3/2016 | Peteroy | H04L 63/1441 713/153 |
| 2016/0110434 A1* | 4/2016 | Kakaraddi | G06F 16/9024 707/602 |
| 2017/0139991 A1* | 5/2017 | Teletia | G06F 16/24544 |

OTHER PUBLICATIONS

Noel, Steven. (Oct. 15, 2015) "CyGraph: Cybersecurity Situational Awareness That's More Scalable, Flexible & Comprehensive," located at <http://neo4j.com/blog/cygraph-cybersecurity-situational-awareness/>; 10 pages.

Shermin, Motahera. (Dec. 2013). "An Access Control Model for NoSQL Databases," *Electronic Thesis and Dissertation Repository.* Paper 1797: 1-86.

* cited by examiner

```
grammar CyQL;
@header {package org.mitre.cygraph.dsl;} query : subset (SETOP subset)* EOF ;
subset : call
       | '(' subset (SETOP subset)* ')' ;
call : FUNCTION '(' ')' | FUNCTION '(' paramList ')' ;

paramList : param (',' param)* ;
param : ID '=' disjunction
      | ID '=' value
      | ID '=' valueList ;

valueList : '[' value (',' value)* ']' ;
value : ID
      | INT
      | GLOB
      | STRING
      | IPV4
      | ipv4Range ;

disjunction : conjunction ('or' conjunction)* ;
conjunction : specifier ('and' specifier)* ;
specifier : '{' paramList '}'
          | '(' disjunction ')' ;
ipv4Range : IPV4 '-' IPV4
          | IPV4 '/' IPV4
          | IPV4 '/' INT ;
```

```
IPV4 : INT '.' INT '.' INT '.' INT ;
FUNCTION : 'network' | 'all' |
           'exploitPaths' | 'correlateAlerts' |
           'cveData' ;

SETOP : 'join' | 'except' | 'union' |
        'intersect' ;
ID : [a-z] [a-zA-Z0-9_]* ;
GLOB : [a-zA-Z*] [a-zA-Z0-9*_-]* ;
INT : [0-9]+ ;

STRING : '"'
         (ESC | ~('"' | '\\'))*
         '"'
         {
setText (org.antlr.v4.misc.CharSupport
.getStringFromGrammarStringLiteral (
    getText ()));
};

fragment ESC : '\\' (['"\\bfnrt] |
UNICODE) ;
fragment UNICODE : 'u' HEX HEX HEX HEX;
fragment HEX : [0-9a-fA-F];

COMMENT : '//' ~[\n]* '\n' -> skip ;

BLOCK_COMMENT : '/*' .*? '*/' -> skip;
WS : [ \t\r\n]+ -> skip ;
```

FIG. 9

SYSTEM AND METHOD FOR VISUALIZING AND ANALYZING CYBER-ATTACKS USING A GRAPH MODEL

FIELD OF THE DISCLOSURE

The present disclosure relates to the security vulnerability analysis of cyber networks. More specifically, the present disclosure relates to systems and methods for modeling a computer network and the impacts of a cyber-attack upon the computer network utilizing graph database techniques that can allow a security analyst to robustly analyze and visualize threats to a computer network and the potential impacts those threats can have upon the network and organizational mission functions.

BACKGROUND OF THE DISCLOSURE

Enterprise computing networks, in which a particular organization employs numerous computing devices that can communicate with one another and share data, are often complex. Adding to this complexity can be the fact that computer networks can constantly change, with machines added and removed, patches applied, applications installed, firewall rules changed, etc. Changes to the network can have substantial impacts on the security posture of the network and the enterprise that employs the network.

Often times, simply detecting a network intrusion may not be sufficient to effectively understand and visualize how the purported attack may impact a computer network and the organizational mission functions that depend on continued network operations. Often times, the obstacle to completely analyzing a computer network for vulnerabilities may not be due to a lack of information, but rather the ability to assemble disparate pieces of information into an overall analytic picture for situational awareness, optimal courses of action, and maintaining mission readiness. Security analysts and operators can be overwhelmed by a variety of consoles from multiple security analysis tools, with each tool providing only a limited view of one aspect of the overall space under consideration. Tools such as security information and event management (SIEM) can help by normalizing data and bringing it together under a common framework. But the data and events can still remain as individual pieces of information, rather than a comprehensive model of network-wide vulnerability paths, adversary activities, and potential mission impacts.

In order to allow security analysts to better assess computer network vulnerabilities, a system that can maximize the analysts' ability to discover potential threats and mission impacts, while minimizing the amount of time it takes to organize multiple and disparate data sources into meaningful relationships for decision making, can prove useful.

SUMMARY OF THE DISCLOSURE

Accordingly, a system and method for visualizing and analyzing network vulnerabilities and cyber-attacks is provided. The system described herein can bring together isolated data and events into an ongoing overall picture for decision support and situational awareness. The system and method can prioritize exposed vulnerabilities, mapped to potential threats in the context of mission-critical assets. In response to actual attacks, the system can correlate intrusion alerts to known vulnerability paths and suggest best courses of action for responding to attacks for maintaining mission readiness. For post-attack forensics, the system and method can determine vulnerable paths that may warrant extra scrutiny by security analysts.

To achieve the above, the system and method can build an attack-graph database model that can map potential attack paths through a network. The graph model can include any network attributes that potentially contribute to attack success, such as network topology, firewall rules, host configuration, and vulnerabilities. The dynamically evolving attack graph can provide context for reacting appropriately to attacks and protecting mission-critical assets. The system can ingest network events such as intrusion detection alerts and other sensor outputs, including packet capture. The system can further incorporate mission dependencies, analyzing the dependency of mission objectives, tasks, and information to cyber assets.

BRIEF DESCRIPTION OF THE DRAWINGS

FIG. 9 illustrates an exemplary domain-specific grammar specification according to examples of the disclosure.

DETAILED DESCRIPTION

Described herein are systems and methods for visualizing and analyzing computer network vulnerabilities that employ a graph database to effectively monitor and assess security threats to a computing infrastructure in real-time. The systems and methods described herein can be used to synthesize information from disparate and varied sources to create an overall visualization of the security posture of a particular computing network.

The system and methods can employ a plurality of sensors designed to provide real-time information about the state of the computer network and integrate the data from the sensors into a graph database that can allow a user of the system to visualize attack pattern relationships, highlight exposed vulnerabilities of the network, provide mission impact analysis, and provide cyber-security modeling and simulation capabilities, among other services.

Figure 1:
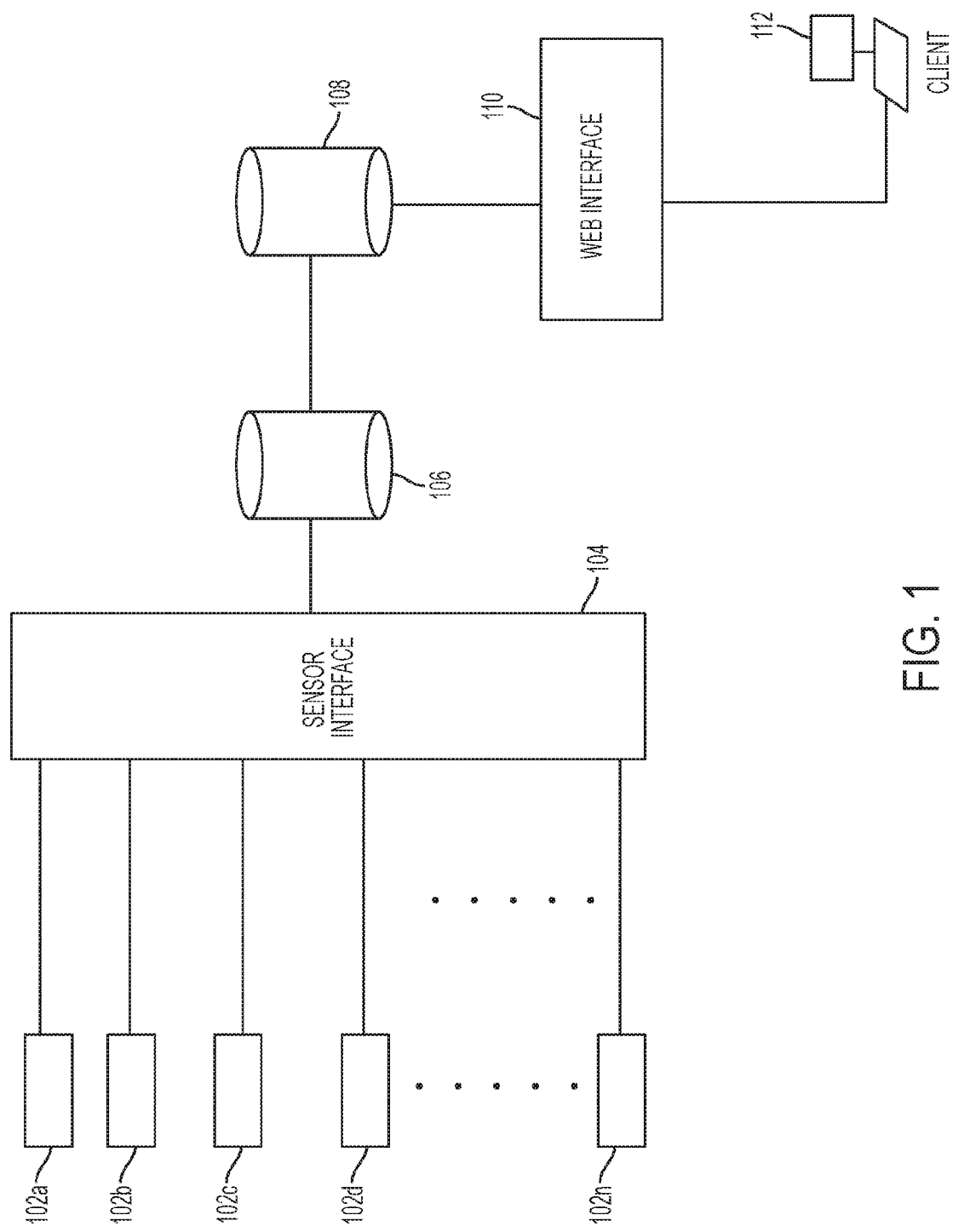
FIG. 1 illustrates an exemplary cyber-security analysis system architecture according to examples of the disclosure.

FIG. 1 illustrates an exemplary cyber-security analysis system architecture according to examples of the disclosure. The system illustrated in FIG. 1 can include various network sensors 102a-n. Sensors 102a-n can represent various sensors and information sources that are located throughout a computer network. Examples of sensors/information that can be inputted to the system from network sensors 102a-n can include information relating to the topology of a network, vulnerabilities of a network, client/server configurations, firewall rules, events, and mission dependency data. Each of the sensors 102a-n can be pre-existing sensors that provide information to a systems analyst. The sensors 102a-n can be deployed at various points throughout a particular computer network.

As an example, network sensors 102a-n can include Cauldron data that can provide network topology (subnets, routes, firewall locations), host enumeration, host vulnerabilities (based on vulnerability scans), and host firewall rules. As another example, network sensors 102a-n can include Threat Assessment Remediation Analysis (TARA) data that can provide enumeration of cyber threats against particular network environments, with possible countermeasures. As another example, network sensors 102a-n can include Intrusion Detection Systems (IDS) that can provide detections of intrusion for mapping to known vulnerability paths leading to mission-critical assets. As another example, network sensors 102a-n can include, Cyber Analytics Repository (CAR) data that can represent the output of cyber analytics against host-based sensors that can be focused on detecting adversary activities. As another example, network sensors 102a-n can include network packet capture data that provides analysis of general network packing flows via network-based sensors. As another example, network sensors 102a-n can include hostflow data, which can include data relating to the analysis of network packet flows from the perspective of host systems. As another example, network sensors 102a-n can include Collaborative Research Into Threats (CRITS) data that can include an analysis of cyber threat intelligence. As another example, network sensors 102a-n can include, Cyber Command System (CyCS) data that can provide data relating to dependencies among mission components (high-level to low-level) as well as mission dependencies, including dependencies on cyber assets. The examples provided above are meant as examples only and should not be construed as limiting in any way.

Conventionally, the data from each of the sensors 102a-n would be available to a security analyst and would provide data about different aspects of the computer network. However, each source of data that the sensor provides would appear disparate from one another and would require an analyst to effectively sift through various streams of data when analyzing a particular computer network. The system illustrated in FIG. 1 can be utilized to "ingest" the data from each of the sensors and by using graph models, create a coherent singular model that an analyst can reference to analyze the state of a computer network.

As illustrated in FIG. 1, each of the sensors 102a-n can be sent to a sensor interface 104 that can ingest the data from each sensor. Sensor interface 104 can provide a standard format for input data from the sensors 102a-n, which can be processed by source-specific client-side adapters located within the interface 104 that can translate data from the sensors into a common format. In this way, data from the sensors 102a-n can be mapped to a common data model. In some examples, the data ingested by the system 100 can come from data sources that are not sensors per se, but that represent information pertaining to the system such as various attack profiles and known system vulnerabilities.

Once the data from the sensors 102a-n have been converted into a standardized format, the ingested data can be normalized and stored in a document-oriented database 106.

As an example, document-oriented database 106 can be implemented as a MongoDB® or other commercially available document-oriented database. The document-oriented database can then be processed and converted into a graph database format stored on a graph database 108. Graph database 108 can be implemented using commercial graph database technologies such as Neo4j® a NoSQL database optimized for graphs.

Graph databases can confer advantages to the security analysts that conventional relational databases may not be able to provide. As an example, while relational databases work well for referencing discreet data items and fixed relationship patterns, relational databases may have difficulties when the relationships themselves are variable, as is often the case in the field of cyber-security.

A graph database approach to security vulnerability modeling can fuse information from a variety of sources to build an analytic model. In one example, the analytical model can be configured as a layered model, which can include the nominal information needed for making informed judgments about mission readiness in the face of cyber warfare. The layers of the model can be predetermined, and the information obtained from the sensors 102a-n can be examined for the purpose of building graph nodes and edges that fit within the layers of the analytical model.

Figure 2:
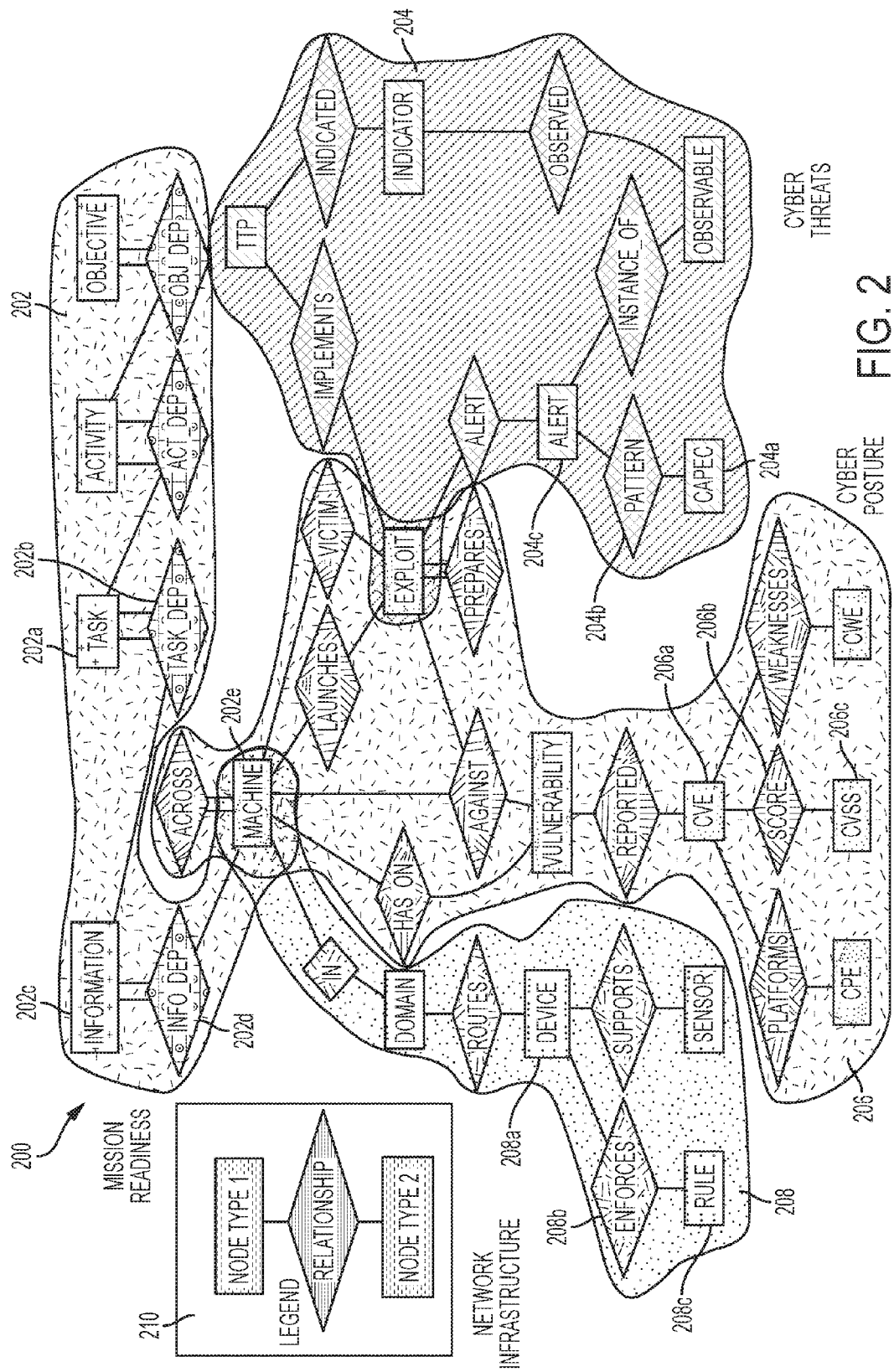
FIG. 2 illustrates an exemplary layered graph model of a computing environment according to examples of the disclosure.

FIG. 2 illustrates an exemplary layered graph model of a computing environment according to examples of the disclosure. The graph model 200 can include 4 separate layers: a mission readiness layer 202, a cyber threats layer 204, a cyber posture layer 206, and a network infrastructure layer 208. The mission readiness layer 202 can include nodes and edges that illustrate how cyber activities can relate to mission elements. The cyber threats layer 204 can include events and indicators of actual cyber-attacks, which can be correlated with elements of the network infrastructure. The cyber posture layer 206 can represent the security posture of the network and the network's preparedness against cyber-attacks. The network infrastructure layer 208 can capture the configuration and policy aspects of the network environment, which can form the basis for modeling security posture (potential vulnerability paths).

The mission dependencies layer 202, in one example, can be populated with data obtained from a process for identifying those cyber assets that are most critical of an organization's mission, such as MITRE's Crown Jewels Analysis. This type of analysis can identify the cyber assets most critical to mission accomplishment for assessing against those assets. In addition, the analysis can select mitigation measures to prevent and/or fight through various attacks. The data from such an analysis can be "ingested" via a sensor 102a-n, as described above. The data associated with such an analysis can form nodes and edges of a graph model.

Figure 3:
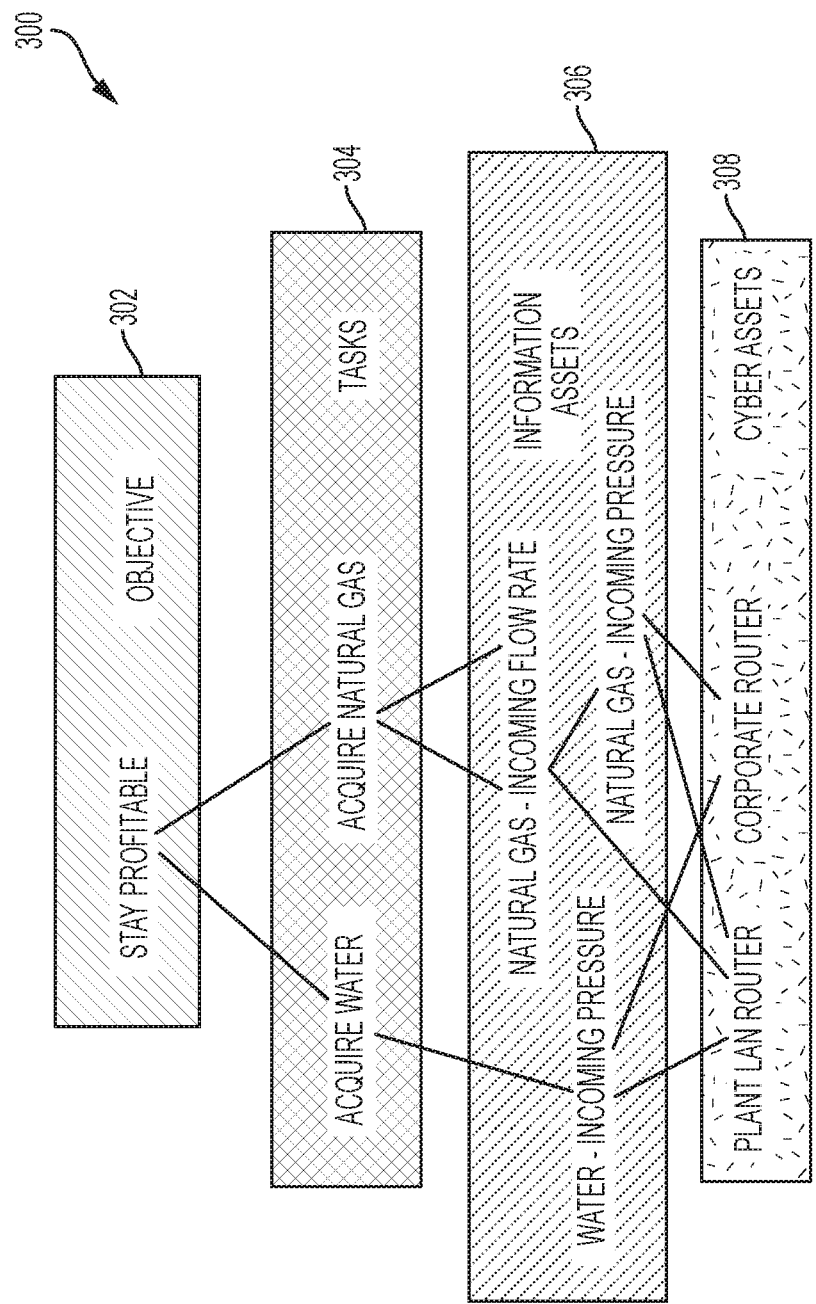
FIG. 3 illustrates an exemplary output of a mission dependency analysis according to examples of the disclosure.

FIG. 3 illustrates an exemplary output of a mission dependency analysis, as described above. The example of FIG. 3 illustrates an exemplary mission dependency analysis for an oil refining plant. The mission dependency analysis 300 can include a set of objectives 302. As shown in the example of FIG. 3, a simple objective for the oil refining plant used for this example can be to stay profitable. With the objectives 302 in mind, the analysis can identify tasks that can be required to ensure that the objectives 302 can be met. In the oil refinery example, the tasks 304 needed to maintain the profit objective identified in 302 can be to acquire water and acquire natural gas. The analysis 300 can also include an analysis of the information assets 306 that can be used to support the tasks 304. In the example of FIG. 3, the information assets can include the natural gas incoming flow rate, the incoming water pressure, and the incoming pressure of the natural gas. Each of these information assets 306 can provide information that is related or critical to the tasks 304 of acquiring natural gas and water, which both can be identified as tasks critical to the objectives 302 of staying profitable. The analysis 300 can also include an analysis of the cyber assets 308 that may be required to support the acquisition of information assets 306. In the example of FIG. 3, the cyber assets 308 can include a plant local area network (LAN) router and a corporate router.

Returning to FIG. 2, the information provided by a mission dependency analysis such as the one discussed above with respect to FIG. 3 can be ingested by the system and converted into a graph model. As an example, the information acquired by the analysis discussed in FIG. 3 can be mapped into a mission readiness graph model layer 202. The mission readiness graph model 202 can include, as an example, a node 202a that identifies a task associated with a mission objective. The mission dependency graph model can also include a node 202c that identifies an information asset. The mission readiness graph model 202 can also include an edge 202b that identifies and contains information relating to the relationship between the task node 202a and the information node 202c. The mission readiness graph model 202 can also include a cyber asset node 202e that contains information on a cyber asset that supports the information asset of 202c. A graph edge 202d can contain information on the dependency between machine node 202e and information node 202c.

The cyber threats graph model layer 204, in one example, can be populated by nodes and edges that are based on data obtained from analysis tools such as Splunk® that can capture, index, and correlate real-time data of the operational environment of a network for the purpose of identifying data patterns commensurate with a cyber-attack or network vulnerability. Additionally, the cyber threats graph model layer 204 can be populated with nodes and edges that are based on data obtained from databases that contain catalogs and taxonomy of attack patterns, such as MITRE's Common Attack Pattern Enumeration and Classification (CAPEC™) Such a database or catalog can provide a standardized catalog and taxonomy of attack patterns and can organize patterns into a taxonomic hierarchy (general attack classes, their sub-classes, and specific attacks).

As examples of nodes and edges within the cyber threats layer 204, the graph model 200 can include a classification/taxonomy node 204a. Classification/taxonomy node 204a can include information about a particular known cyber-attack and its classification/taxonomy according to sources such as CAPEC discussed above. The cyber threats layer 204 can also include an alert node 204c. Alert node 204c can include information gathered in real-time about the state of a network, such as the type of data gathered by Splunk discussed above. Using Splunk as an example, when Splunk identifies a suspicious pattern of behavior within a network, it can generate an alert that can be represented by an alert node 204c. The pattern of behavior that generated alert 204c can be represented by an edge 204c of the graph model 200 that can contain information related to the pattern that would trigger an alert 204c. The edge 204c can connect nodes 204a and 204c such that the relationship between a particular alert as discovered by data sources such as Splunk can be related back to known cyber-threats as detailed in a classification of cyber-threats, such as CAPEC.

The cyber posture layer 206 can include nodes and edges associated with potential exploitable vulnerabilities within a network infrastructure. As an example, the nodes and edges associated with the cyber posture layer 206 can be populated with data from the Common Vulnerabilities and Exposure (CVE) platform that provides a dictionary of common names for publicly known cybersecurity vulnerabilities and can evaluate network infrastructure to determine the exposure of the network to such vulnerabilities. In addition, the nodes and edges associated with the cyber posture layer 206 can be populated with data from the Common Vulnerability Scoring System (CVSS) platform. CVSS is a standard for assessing the severity of computer system security vulnerabilities. CVSS can attempt to assign severity scores to vulnerabilities, allowing network managers to prioritize responses and resources according to the threat.

In the example of FIG. 2, cyber posture layer 206 can include a CVE node 206a that can relate to a vulnerability of the network and a CVSS node 206c that pertains to a scoring of such vulnerability. The nodes 206a and 206c can be related using the graph edge 206b that can contain information pertaining to the score of the CVE vulnerability node 206a using the CVSS scoring model as represented by node 206c.

As discussed above the graph model 200 can include a network infrastructure layer 208. The network infrastructure layer 208 can include information that captures the configuration and policy aspects of the network environment, which can form the basis for modeling security posture (i.e., potential vulnerability paths). As an example, the graph model 200 can leverage known tools such as Cauldron that can aid in visualizing potential attacks against an enterprise by building a network model using results from vulnerability scanners, asset management, firewall rules, and other network data sets. As an example, the network infrastructure layer 208 can include a device node 208a that, in one example, can represent a firewall within an enterprise network. The network infrastructure layer 208 can also include a rules node 208c that can represent a set of rules of network behavior, such as which types of data packets to filter or which network traffic to block. The relationship between nodes 208a and 208c can be represented by edge 208b, which can represent the fact that the firewall device represented by device node 208a enforces the rules represented by node 208c.

Once the graph model 200 has been constructed using all of the various sensors 102a-n that were ingested by the system 100, the graph model 200 can be ready to be queried by a user of the graph model. Generally, a commercial-off-the-shelf graph database technology, such as Neo4J discussed above, will have a query language associated with it. The query language associated that is employed by the graph database technology might be overly verbose, since the language can be domain agnostic and thus make it applicable to any scenario in which a graph database is to be employed. A domain-specific query language may be helpful in creating a user-friendly syntax that allows a user to query the graph database explained with respect to FIG. 2.

The domain specific language can have cyber semantics encoded within it, thereby encapsulating and hiding many of the constraints that would have to be expressed in a native graph database query. The domain-specific language can reduce the learning curve and increase the productivity of the security analysts and content developers using the analysis system 100 of FIG. 1.

Once a user has input a query into the domain-specific language, it can then be converted into the native graph database query language used by the graph database platform employed by the analysis system 100 of FIG. 1. This additional layer of abstraction can allow the system 100 to support multiple backend data engine implementation, each with their own native query language. This can allow users and application software to interact with the system 100.

The domain-specific query language can include grammar that facilitates user-friendly use of the query capabilities of the graph system. As examples, the domain-specific language can include primitives relating to entity (node) types such as machines, exploits, alerts, indicators, and vulnerabilities. The domain-specific language can include properties such as IP address, MAC addresses, Hostname, Operating system, and Applications. The domain specific language can include relationship (edge) types, such as "against" (exploit against vulnerability), "on" (vulnerability on machine), and "enables" (machine enables exploit).

An example scenario that employs the graph database modelling and domain-specific query language described above can provide clarity as to the operation of the system 100 described in FIG. 1. In the example scenario, an intrusion detection system such as SNORT®, which can be one of the sensors 102a-n that is ingested in the example of FIG. 1, can be triggered generating an alert. Specifically, the SNORT platform can generate an alert indicating the detection of a buffer overflow attack against a network client machine (the cache poisoning attacking against the DNS server was not detected). To understand the context for this alert, the analyst can submit a query in the domain-specific language that in plain terms asks for the alert, shows the source (attacking) machine, and shows whether this alert is a detection of exploitation against a vulnerability on a machine in the network.

Figure 4:
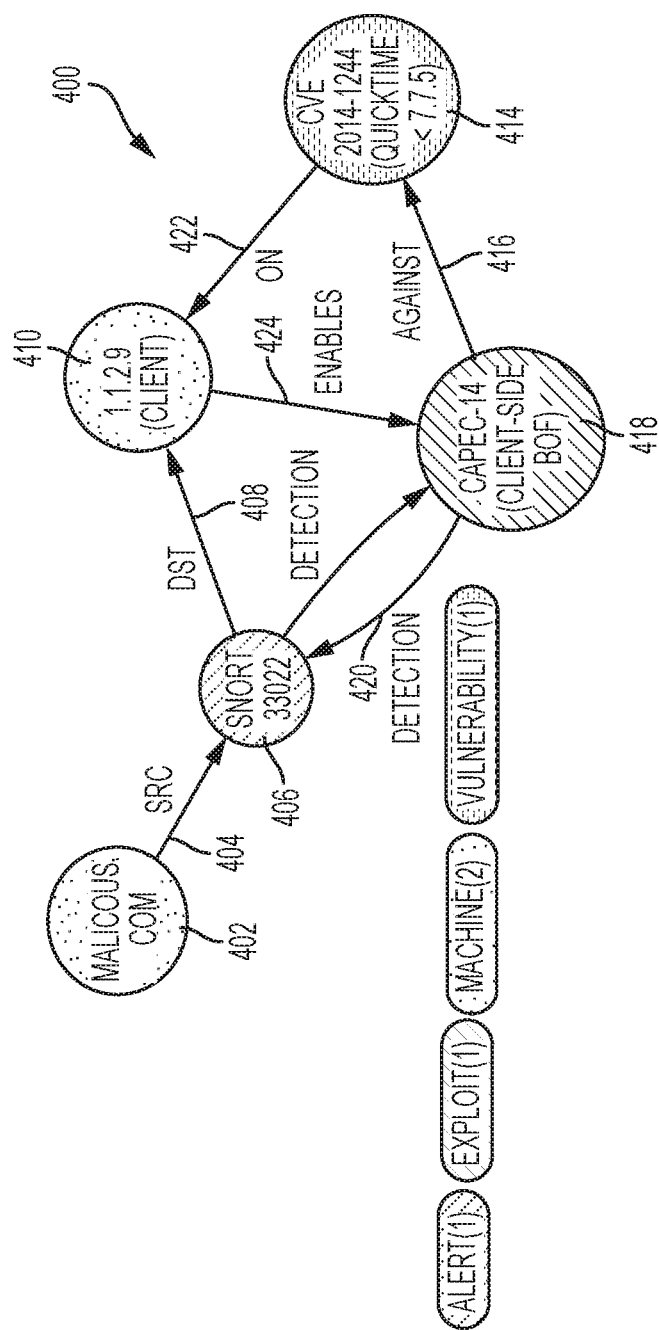
FIG. 4 illustrates an exemplary sub-graph generated by a query according to examples of the disclosure.

FIG. 4 illustrates an exemplary sub-graph generated by a query according to examples of the disclosure. The sub-graph 400 illustrated in FIG. 4 can be a sub-graph that is generated by the query discussed in the preceding paragraph. The sub-graph 400 returned by the query can have 4 nodes associated with it. Node 402 can represent the source machine for the alert, which in the example of FIG. 4 can be a website denoted as malicious.com. Node 406 can represent the specific alert generated by SNORT. The edge 404 can denote the relationship between node 402 and node 406, which in this example can represent that malicious.com is the source for the alert generated by SNORT. Node 410 can represent the destination for the malicious activity by the SNORT alert represented by node 406. Edge 408 can denote this relationship by indicating that the client computer indicated by node 410 is the destination for the malicious activity that generated the alerted denoted by node 406.

Node 418 can represent a cyber threat node that is associated with a known CAPEC attack pattern for a client-side buffer overflow. Edge 420 can represent the relationship between nodes 406 and 418, which in the example of FIG. 4 can indicate that the SNORT alert of node 406 is indicative of the CAPEC attack pattern denoted by node 418 that is associated with a client-side buffer overflow. Node 414 can represent a known CVE vulnerability that allows for the type of attack represented by node 418. In the example of FIG. 4, node 414 can represent a known CVE vulnerability in which the version of QuickTime is less than version 7.75. Edge 416 can represent that such a vulnerability is associated with the buffer flow attack denoted by node 418. Edge 422 can denote that the CVE vulnerability is on the client denoted by node 410. Finally, edge 424 can represent the relationship between nodes 410 and 418 in that the client machine denoted by node 410 can enable the type of attack denoted by node 418.

Accordingly, the sub-graph 400 of FIG. 4 can show that the victim of this alert does in fact have a vulnerability associated with an exploit (CAPEC attack pattern) that the intrusion signature (SNORT 33022) detects. Here, there are additional relationships (not specified in the query) that the graph database includes as associated with the returned nodes (i.e., DST for the alert's destination machine and ENABLES representing the enabling of future possible exploitation).

In furtherance of the above example, assume that a second alert is generated, which detects attempts at probing a web application for potential vulnerabilities. The analyst, already being suspicious about the first alarm (and the associated vulnerability), can issue a query to analyze how the two alerts might be related. Using the domain-specific query language, the analyst can generate a query that translates in plain terms to "show me everything between these two alerts, using the relationship types about alerts and vulnerability exploitation."

Figure 5:
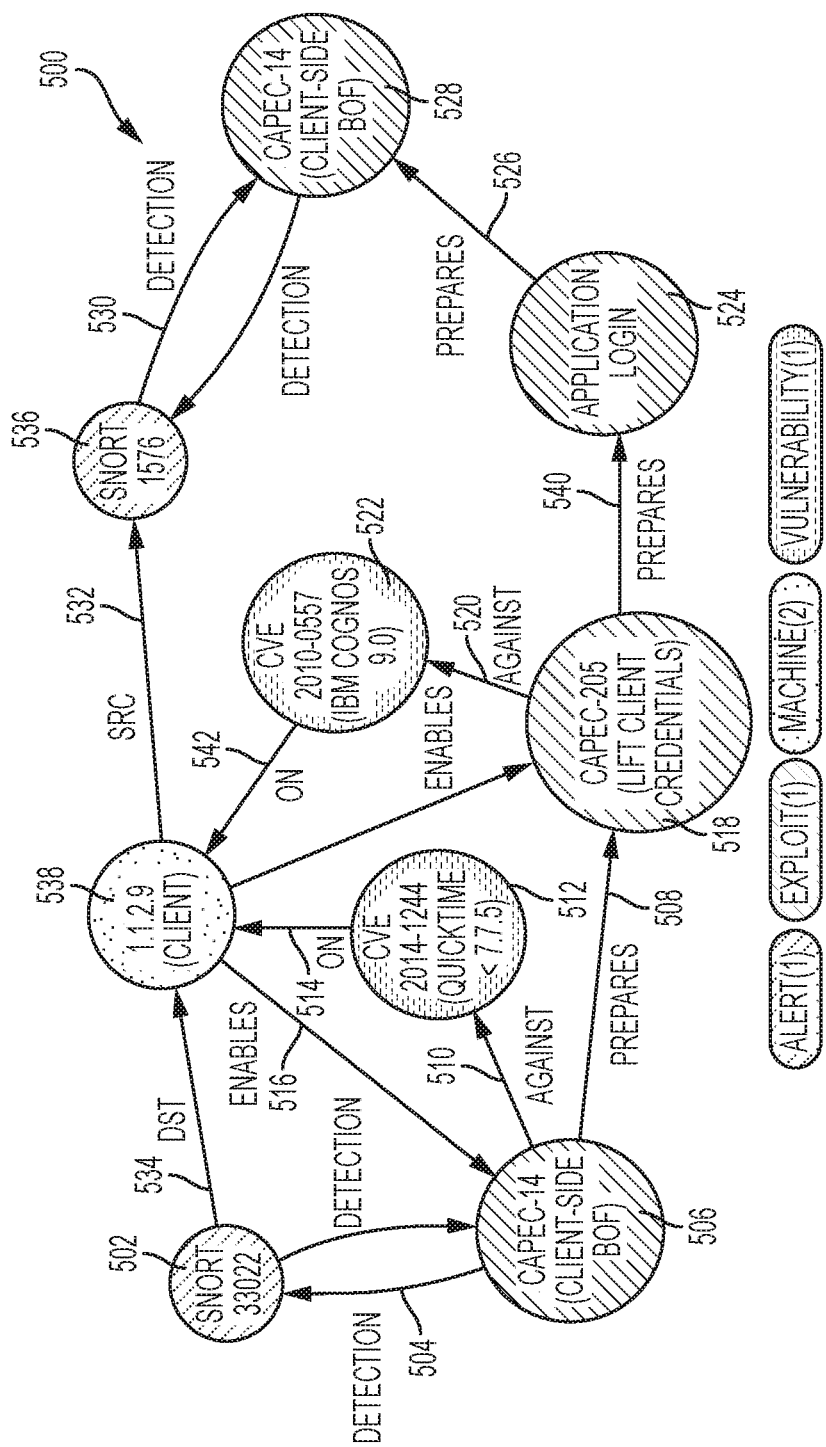
FIG. 5 illustrates another exemplary sub-graph generated in response to a query according to examples of the disclosure.

FIG. 5 illustrates another exemplary sub-graph generated in response to a query according to examples of the disclosure. The sub-graph 500 illustrated can be generated in response to the query outlined in the preceding paragraph. In response to the query, the sub-graph 500 can be generated and include the two alerts (alarms) denoted by nodes 502 and 536, which can represent SNORT alerts. Edges 534 and 532 can represent the relationship between nodes 502, 536, and 538, expressing the relationship that the malicious activity associated with alert node 502 is destined client machine node 538 that provides a source for alert node 536.

Nodes 506, 512, and 538 and edges 504, 510, and 514 can represent the relationships described above with respect to nodes 418, 414, and 410 and edges 404, 416, and 422, respectively, of FIG. 4, and a discussion of the relationships can be found in the corresponding text. Node 518 can represent a known CAPEC attack labeled as "lift client credentials." Edge 508 can illustrate the relationship between attack nodes 506 and 518, specifically representing the fact that the buffer overflow attacking denoted by node 506 can prepare the system to be attacked by the "lift client credentials" attack denoted by node 518. Node 522 can indicate a CVE vulnerability associated with IBM Cognos® version 9.0 that can enable the attack denoted by node 518. Edge 520 can illustrate the relationship between nodes 518 and 522 insofar as the attack denoted by node 518 can use the vulnerability associated with node 522 to attack a machine. Edge 542 can denote that the client machine denoted by node 538 has the vulnerability denoted by node 522.

Node 524 can represent an application login attack and edge 540 can illustrate the relationship between nodes 518 and 524, specifically showing that the attack denoted by node 518 can prepare the machine to be attacked by the attack denoted by node 524. Node 528 can represent a CAPEC attack pattern associated with web application fingerprinting, and Edge 526 can represent the relationship between node 528 and 524, insofar as the attack denoted by 524 can prepare a machine to be attacked by the known attack pattern denoted by node 528. Edge 530 can represent the relationship between alert 536 and the attack pattern denoted by node 528.

The sub-graph 500 can illustrate that the two alerts are indeed related (i.e., there is a chain of potential exploits linking them: client-side buffer overflow against mission client machine, lifting of database login credentials on client, logging in to database from client, and fingerprinting to discover potential database vulnerabilities). In this chain, two of the exploits are against known vulnerabilities. Just as for missed intrusion detections, vulnerability scanners do not always find existing vulnerabilities. In fact, in this case, the database login (after stealing the password) is essentially indistinguishable from a benign login, and thus has no associated vulnerability or alert. Still, given this query result, the analyst might suspect that these are potentially multiple attack steps by the same threat actor.

Figure 6:
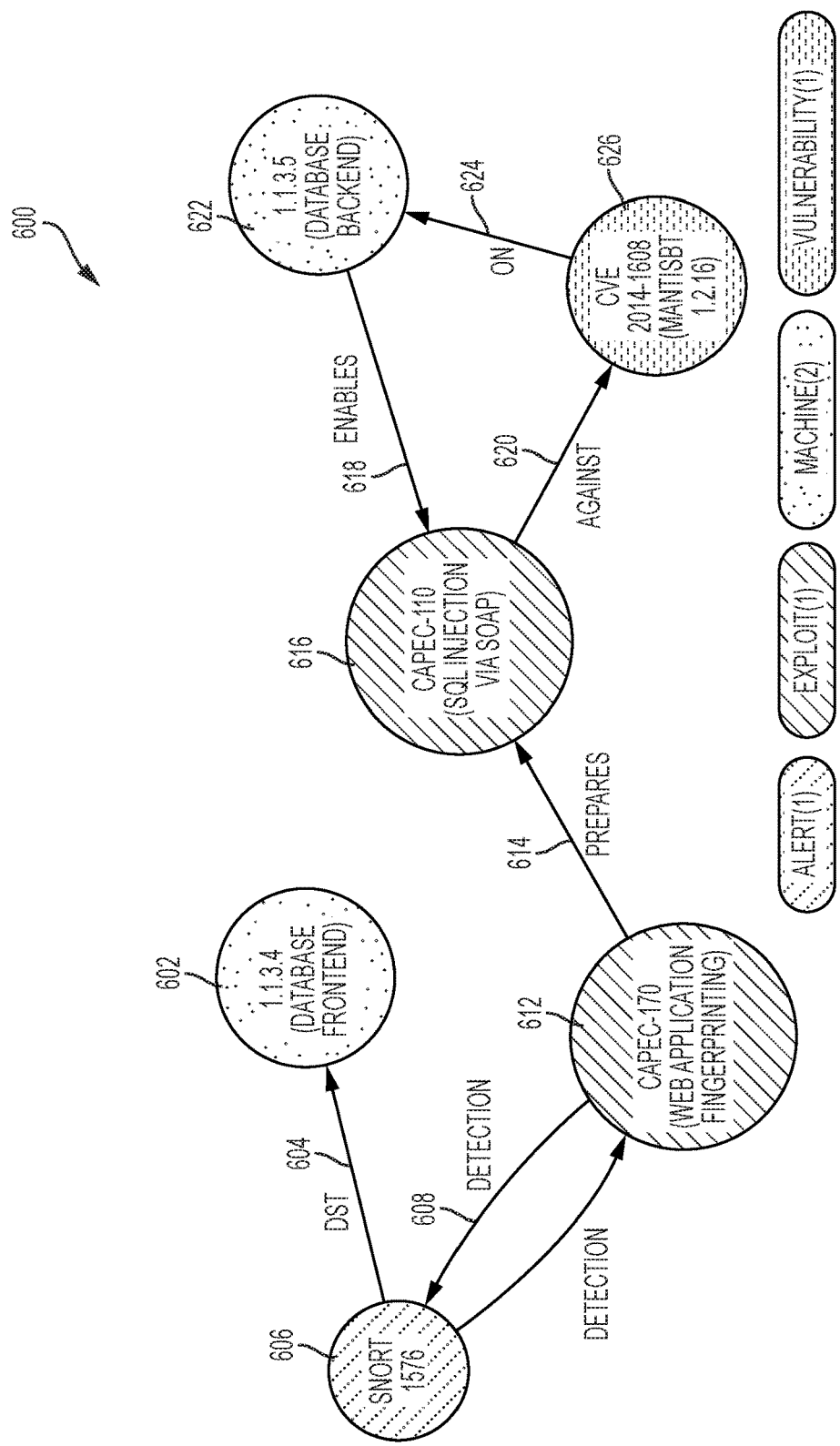
FIG. 6 illustrates another exemplary sub-graph in response to a query according to examples of the disclosure.

Being concerned, the analyst might want to understand the next possible steps that the attacker could take and generate a new query that asks "show me everything that can happen after the second alert." FIG. 6 illustrates an exemplary sub-graph for query according to examples of the disclosure. Specifically, the example of FIG. 6 illustrates an exemplary sub-graph for the query described in the preceding paragraph. Nodes 606 and 612, and edge 608, can correspond to nodes 536 and 528, and edge 520, respectively, and a discussion of those nodes can be found in the corresponding text. Node 602 can represent a database frontend machine, and edge 604 can represent the relationship between nodes 606 and 602, illustrating that the suspicious activity associated with node 606 can be destined for the database frontend associated with node 602.

Node 616 can represent a CAPEC attack pattern associated with Structured Query Language (SQL) injection via SOAP. Edge 614 can illustrate the relationship between nodes 612 and 614, specifically illustrating that the attack denoted by node 612 can prepare a network for the attack associated with node 616. Node 626 can represent a known CVE vulnerability in which the MantisBT® software loaded on a machine has a version that is older than version 1.2.16. Edge 620 can illustrate the relationship between nodes 616 and 626, illustrating that the attack denoted by node 616 can exploit the vulnerability denoted by node 626. Node 622 can represent a database backend machine, and edge 626 can illustrate that the vulnerability identified by node 626 is present on the machine denoted by node 622. Finally, edge 618 can illustrate the relationship between the attack denoted by node 616, showing that the machine denoted by node 622 can enable the attack denoted by node 616. The sub-graph of FIG. 6 can illustrate that the web application fingerprinting against the database frontend server machine (which was detected) prepares for a subsequent attack against the database backend. Exploitation of this vulnerability would let the attacker inject arbitrary SQL commands (e.g., to steal, corrupt, or destroy mission-critical information).

Figure 7:
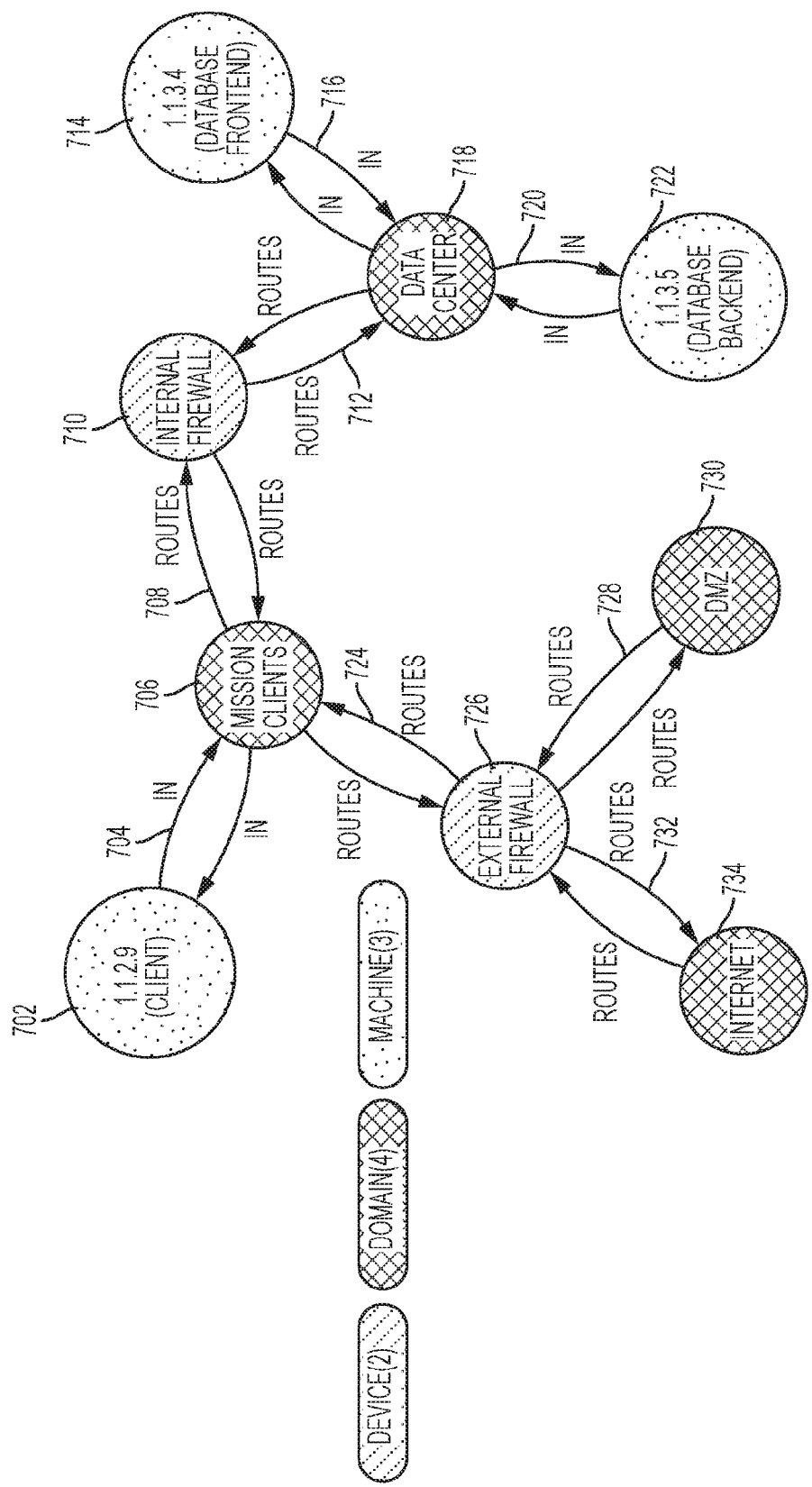
FIG. 7 illustrates another exemplary sub-graph in response to a query according to examples of the disclosure.

Returning to the example scenario, the analyst at this point may suspect that a malicious attack is being launched from the client machine discussed with respect to FIGS. 4 and 5. To better understand potential response options, the analyst may pose a query asking to show the network topology and how the machines in the topology (i.e., the client, the database frontend, and the database backend) connect to it. FIG. 7 can illustrate the resulting sub-graph generated in response to the query.

Sub-graph 700 can include node 702, which can represent the client machine discussed above with respect to FIGS. 4 and 5. Node 706 can represent a mission-clients domain, and edge 704 can illustrate the relationships between nodes 702 and 706, showing that the client machine represented by node 702 can be within the mission client domain represented by node 706. Node 726 can represent an external firewall that sits between the mission client domain represented by node 706 and the internet domain and DMZ domain represented by nodes 734 and 730, respectively. Edges 724, 728, and 732 can illustrate the routing relationships between the mission-clients domain represented by node 706, the external firewall denoted by node 726, and the Internet and DMZ domains denoted by nodes 734 and 730 respectively.

Node 710 can represent an internal firewall 710, and edge 708 can show the routing relationship between the mission-clients domain denoted by node 706 and the data center domain denoted by node 718. Nodes 714 and 722 can represent the database frontend and database backend, respectively, and edges 716 and 720 can illustrate the relationship between the database frontend (node 714) and database backend (node 722), illustrating that the database backend and frontend are located within the data center domain.

Sub-graph 700 can thus illustrate that the internal firewall is in position to block traffic from the suspicious client to the mission-critical servers. Also, based on the correlation with the initial alert (client-side buffer overflow), the network analyst may suspect that the network client machine is being controlled from the outside. For that, blocking via the external firewall is an option based on the sub-graph 700.

Figure 8:
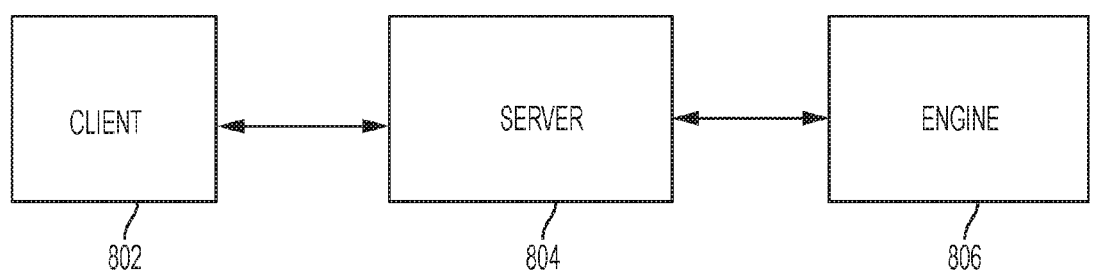
FIG. 8 illustrates an exemplary client-server architecture according to examples of the disclosure.

Finally, the network analyst may want to better understand how the attacker might have gained entry into the network. Using the domain-specific language, the analysis may generate a query that asks to show all paths (of arbitrary depth) using relationship types about alerts and vulnerability exploitation that can lead to an exploit detected by the initial alert. FIG. 8 can illustrate the resulting sub-graph 800 from such a query. Sub-graph 800 can suggest that the cache poisoning vulnerability is a likely precursor to the buffer overflow attack on the client, even though the cache poisoning attack was not itself detected.

FIG. 8 illustrates an exemplary client-server architecture according to examples of the disclosure. The architecture of the system illustrated in FIG. 1 can be based on a distributed client-server model, partitioning tasks between service providers (servers) 804 and service requesters (clients) 802. Clients 802 and servers 804 can be deployed on separate hosts (real and/or virtual) or can be configured to run on a single (local) host.

Client 802 can provide a graphical user interface to a user of the system that allows for the input of queries to the system and visualizing query results. The client 802 can communicate with the server 804 through web application program interface (API) calls. In one example, the client 802 can be implemented in Java as a desktop application. Using a decoupled client-server architecture can allow for the implementation of other clients on other platforms (e.g., a web browser). Returning to the example system of FIG. 1, the client 802 can implement the client 112 as well as the web interface 110.

Server 804 can act as a middle-tier intermediary between the client 802 and the database that is stored on the engine 806. The server 804 can provide a layer of abstraction that gives a common service interface, regardless of how the database backend (and its native query language) is implemented. The server 804 handles the interpretation of a domain-specific query language (as discussed above) into native database queries. The server 804 also can house a library of commonly issued queries to capture domain knowledge, streamline the analytic workflow, and help ease the learning curve for new analysts.

A query in the domain-specific query language can be implemented as one or more function calls, each of which can return a matching subgraph. Multiple function calls can be chained with the keyword "join" as an example. Each function can take a list of parameters (i.e., name-value pairs). In one example, a value can be a single key-value pair with a primitive-type value, a list of literal values for a parameter (key), or a "specifier," which can be a list of parameters and their values. In one example, function calls may not be nested, but specifiers may be nested. As an example, primitive types can include integers, strings, IPv4 addresses, IPv4 ranges (expressed in different formats), and hostname patterns (which can be literal or can contain wildcards). Values may not have to be quoted, except for, in some examples, strings which contain spaces or special characters. Examples of domain-specific query language primitives can include: Entity (node) Types, Machines, Users, Servers, Processes, Vulnerabilities, Properties (i.e., IP Address, MAC Address, Hostname, Operating System, Applications), Relationship (edge) Types (i.e., Attacks, IsVulnerableTo), Primitive Types, Identifiers, Integers, Strings, IPv4 address, CIDR range, etc.

FIG. 9 illustrates an exemplary domain-specific grammar specification according to examples of the disclosure. The example of FIG. 9 illustrates the specification of the grammar of the domain-specific query language in Another Tool for Language Recognition (ANTLR®) format. ANTLR is provided as an example, and the domain-specific language can be specified in another format according to other examples of the disclosure. ANTLR can act as a parser generator for reading, processing, executing, or translating structured text or binary files. In the example of FIG. 9, the grammar specification 900 can define a query as a collection of function calls. A function can be a particular query type, such as mapping a network topology, correlating intrusion alerts, or traversing exploitable vulnerability paths. Function parameters can be used and combined with Boolean operations (AND, OR, and NOT) to refine a query based on node properties and relationships. These results can then be expanded by JOINing other functions to provide additional context when it is needed.

Using the example syntax of FIG. 9, an example query can illustrate the simplification of syntax that a domain-specific query language can provide vis-à-vis a native domain agnostic query language. For instance, a query can find "exploit paths," i.e., sequences of vulnerabilities that an adversary could exploit for step-by-step lateral movement through a network. In some examples, these need not be simply linear chains (i.e., single paths). Rather, the query can find all possible paths (including alternative branches/merges) between a specified set of machines. From a security analyst's perspective this means "show me all the possible ways that an adversary can get from these machines to those machines."

While that kind of query can answer the basic question about attacker reachability among network machines (exploitable paths), the analyst might want to refine the query further to provide more specific focus. For example, an analyst might want to only include a certain group of machines (e.g., having a common hostname pattern), or include only those machines that have alerts for them.

On the other hand, the analyst might wish to expand a basic query by including additional information such as vulnerabilities associated with the machines in a set of exploitable paths. The query language should allow a rule as simple as 'join vulnerabilities( )' such that the appropriate vulnerability subgraphs are joined with the corresponding machine nodes of the exploit-paths subgraph.

The function exploitPaths( ) determines the structure and the types of edges in the matching subgraph. Its arguments get compiled to an SQL-like WHERE clause that constrains the node properties that match the query. For the exploit-Paths( ) function, constraining arguments include starting and ending machines for an exploitable subgraph.

Consider this example query using the domain-specific query language discussed above:

```
exploitPaths
(
    start =
    (
        (
            {subnet=1.1.3.0/24} or
            {ip=[1.1.4.32, 1.1.4.33]}
        ) and
        {hostname=*-VM*},
    end = {name = "DB Server"}
)
```

Below, can be the resulting query compiled from the domain-specific query language to a native database query language such as Neo4j® Cypher:

```
MATCH (start)-
    [r:
    AGAINST |
    VICTIM |
    ON |
    LAUNCHES|
    IN |
    ROUTES*]
    -(end)
WHERE
(
    (
        start.subnet = "1.1.3.0/24" OR
        start.ip IN ["1.1.4.32", "1.1.4.33"]
    )
    AND start.hostname =~
        "^[a-zA-Z0-9_-]*-VM-[a-zA-Z0-9_-]*$"
)
AND (end.name = "DB Server")
RETURN start, r, end
```

In comparing the corresponding queries for these two languages (domain specific and native query languages), it can be seen that the native database query language can be more verbose. This can be because the native query language is completely domain agnostic, while the domain-specific query language can leverage cybersecurity domain knowledge. In this case, the domain-specific query language can encapsulate the knowledge of allowed relationship types (AGAINST, VICTIM, ON, LAUNCHES, IN, and ROUTES as illustrated in FIG. 2) for subgraphs representing attack reachability between machines. This is based on the role of those particular relationship types in the data model (discussed below).

The system 100 of FIG. 1 can employ various model types for representing graph data in its computational processing flows (for model building, queries, analysis, and visualization). A client-side model-building application can parse a particular data source from its native format and map the data elements to a data ingest model. This data ingest model can represent a collection of nodes (graph vertices) and relationships (graph edges), with various properties for each. This includes unique identifiers for nodes, and time stamps for relationships. Arbitrary properties (key-value pairs) can also be defined for each node and relationship.

Figure 10:
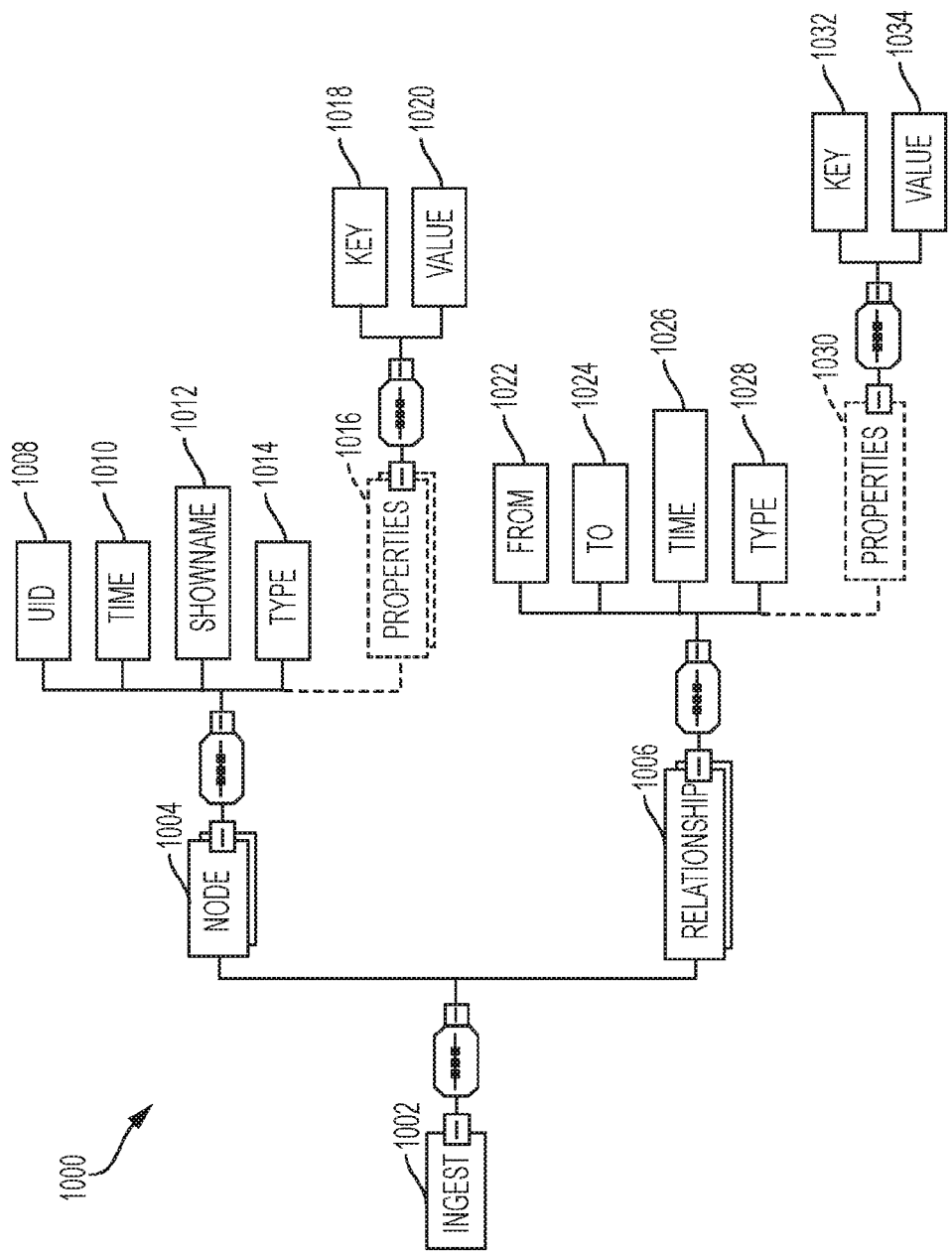
FIG. 10 illustrates an exemplary data ingest model according to examples of the disclosure.

FIG. 10 illustrates an exemplary data ingest model according to examples of the disclosure. In the example of FIG. 10, the data ingest model 1000 can convert data taken from a sensor (as discussed above with respect to FIG. 1) and convert it to data model that is compatible with a graph database implementation.

With a priori knowledge of all of the possible sensor inputs (relevant for example to the data model of FIG. 2), the system 100 of FIG. 1 can implement one or more algorithms to parse the received data and convert it into a common data format that is compatible with a graph database. As an example, the ingested data 1002 can be parsed so as to provide data to build a multitude of nodes 1004 and relationships 1006 that will eventually be converted into nodes and edges of a graph database. The ingested data 1002 from the sensor can be parsed for data related to the nodes 1004 and relationships 1006. As example, the ingested data 1002 can be parsed to provide information about an instance of a node 1004 including attributes such as: unique identified (UID) 1008, time 1010, name 1012, type 104, as well as various properties 1016, defined by key 1018 and value 1020. An algorithm can be programmed such that the ingested data is parsed to provide the above values.

Additionally, the ingested data 1002 can be parsed to provide information about the relationships between nodes that can ultimately form the edges of the graph database. As an example, information pertaining to an instance of a relationship 1006 can include such values as From 1022, To 1024, Time 1026, and Type 1028, as well as properties 1030 that are defined in terms of a property Key 1032 and Value 1034. The above examples of node 1004 values and relationship 1006 values are for example purposes only and should not be construed as limiting in any manner. The properties outlined in the example of FIG. 10 can additionally include any property that could be associated with nodes and relationship in a graph database. The data model 1000 can further be converted to a data model native to the graph database software being used to implement the graph database such as Neo4j®.

Returning to FIG. 8, the engine 806 can be the storage unit for the graph data (node, relationship, and properties). The engine 806 can process queries from the server 804 in the native language of the database implementation.

Figure 11:
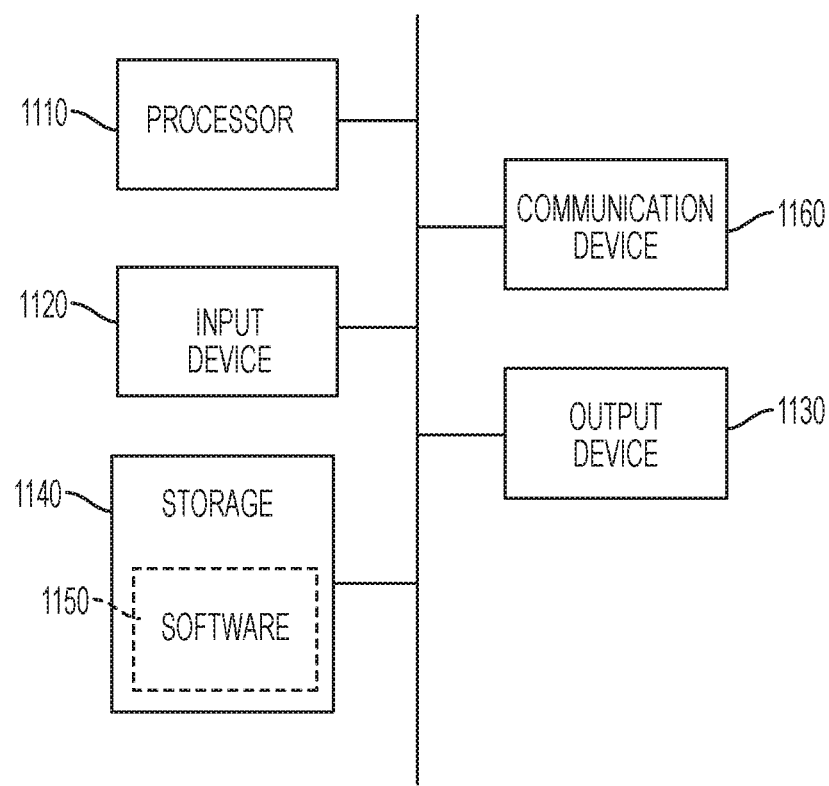
FIG. 11 illustrates an example of a computing device in accordance with one or more examples of the disclosure.

FIG. 11 illustrates an example of a computing device in accordance with one or more examples of the disclosure. Device 1100 can be a host computer connected to a network. Device 1100 can be a client computer or a server. As shown in FIG. 11, device 1100 can be any suitable type of microprocessor-based device, such as a personal computer, workstation, server, or handheld computing device (portable electronic device), such as a phone or tablet. The device can include, for example, one or more of processor 1110, input device 1120, output device 1130, storage 1140, and communication device 1160. Input device 1120 and output device 1130 can generally correspond to those described above, and they can either be connectable or integrated with the computer.

Input device 1120 can be any suitable device that provides input, such as a touch screen, keyboard or keypad, mouse, or voice-recognition device. Output device 1130 can be any suitable device that provides output, such as a touch screen, haptics device, or speaker.

Storage 1140 can be any suitable device that provides storage, such as an electrical, magnetic, or optical memory including a RAM, cache, hard drive, or removable storage disk. Communication device 1160 can include any suitable device capable of transmitting and receiving signals over a network, such as a network interface chip or device. The components of the computer can be connected in any suitable manner, such as via a physical bus or wirelessly.

Software 1150, which can be stored in storage 1140 and executed by processor 1110, can include, for example, the programming that embodies the functionality of the present disclosure (e.g., as embodied in the devices described above).

Software 1150 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A computing system for assessing a computer network using a graph database, comprising:
    a plurality of network sensors;

one or more sensor interfaces configured to received data from the plurality of network sensors;
one or more processors;
memory; and
one or more programs stored in the memory that when executed by the one or more processors cause the one or more processors to:
  receive data from the plurality of network sensors and convert the received data to a common format, wherein the received data is based on a present state of a computer network;
  generate a graph model comprising a plurality of nodes and a plurality of edges based on the data converted to the common format and store the generated plurality of nodes and the plurality of edges within a graph database, wherein the graph model comprises a plurality of predetermined layers, each layer associated with a type of computer-network information and comprising a subset of the plurality of nodes and the plurality of edges that is generated from the received data supplying the type of computer-network information associated with that layer;
  receive a cyber-domain specific data query from a user of the computing system;
  convert the received cyber-domain specific data query to a graph database native query comprising function calls for returning corresponding matching subgraphs from the plurality of predetermined layers of the graph model; and
  execute the graph database native query upon the graph database to provide the user with a visualization of the returned matching subgraphs from across the predetermined layers of the graph model.

2. The computing system of claim 1, wherein a layer of the plurality of predetermined layers comprise a subset of the generated plurality of nodes and a subset of the plurality of edges that convey information about a mission readiness state of the computer network.

3. The computing system of claim 2, wherein at least one node and at least one edge of the plurality of nodes and plurality of edges convey information about a mission objective of the computing network.

4. The computing system of claim 3, wherein at least one node and at least one edge of the plurality of nodes and plurality of edges convey information about a task of the computing network, wherein the task is based on the mission objective of the computing network.

5. The computing system of claim 4, wherein at least one node and at least one edge of the plurality of nodes and plurality of edges convey information about an information asset of the computing network, wherein the information asset is based on the task of the computing network.

6. The computing system of claim 3, wherein at least one node and at least one edge of the plurality of nodes and plurality of edges convey information about a cyber asset of the computing network, wherein the cyber asset is based on the information asset of the computing network.

7. The computing system of claim 1, wherein a layer of the plurality of predetermined layers comprise one or more nodes and one or more edges that convey information about potential cyber threats to the computer network.

8. The computing system of claim 1, wherein a layer of the plurality of predetermined layers comprise one or more nodes and one or more edges that convey information about a cyber posture of the computer network.

9. The computing system of claim 1, wherein a layer of the plurality of predetermined layers comprise one or more nodes and one or more edges that convey information about an infrastructure of the computer network.

10. The computing system of claim 1 comprising:
  a document-oriented database configured to receive the data from the plurality of sensors and convert the received data into one or more entries in the document-oriented database, and wherein the graph database is configured to generate the plurality of nodes and the plurality of edges based on the one or more entries in the document-oriented database.

11. A method of assessing a computer network using a graph database, the method comprising:
  receiving data from a plurality of network sensors and convert the received data to a common format, wherein the received data is based on a present state of a computer network;
  generating a graph model comprising a plurality of nodes and a plurality of edges based on the data converted to the common format and store the generated plurality of nodes and the plurality of edges within a graph database, wherein the graph model comprises a plurality of predetermined layers, each layer associated with a type of computer-network information and comprising a subset of the plurality of nodes and the plurality of edges that is generated from the received data supplying the type of computer-network information associated with that layer;
  receiving a cyber-domain specific data query from a user;
  converting the received cyber-domain specific data query to a graph database native query, comprising function calls for returning corresponding matching subgraphs from the plurality of predetermined layers of the graph model; and
  executing the graph database native query upon the graph database to provide the user with a visualization of the returned matching subgraphs from across the predetermined layers of the graph model.

12. The method of claim 11, wherein a layer of the plurality of predetermined layers comprise a subset of the generated plurality of nodes and a subset of the plurality of edges that convey information about a mission readiness state of the computer network.

13. The method of claim 12, wherein at least one node and at least one edge of the plurality of nodes and plurality of edges convey information about a mission objective of the computing network.

14. The method of claim 13, wherein at least one node and at least one edge of the plurality of nodes and plurality of edges convey information about a task of the computing network, wherein the task is based on the mission objective of the computing network.

15. The method of claim 14, wherein at least one node and at least one edge of the plurality of nodes and plurality of edges convey information about an information asset of the computing network, wherein the information asset is based on the task of the computing network.

16. The method of claim 13, wherein at least one node and at least one edge of the plurality of nodes and plurality of edges convey information about a cyber asset of the computing network, wherein the cyber asset is based on the information asset of the computing network.

17. The method of claim 11, wherein a layer of the plurality of predetermined layers comprise one or more nodes and one or more edges that convey information about potential cyber threats to the computer network.

18. The method of claim 11, wherein a layer of the plurality of predetermined layers comprise one or more nodes and one or more edges that convey information about a cyber posture of the computer network.

19. The method of claim 11, wherein a layer of the plurality of predetermined layers comprise one or more nodes and one or more edges that convey information about an infrastructure of the computer network.

20. The method of claim 11, comprising:
receiving the data from the one or more sensors and converting the received data into one or more entries in a document-oriented database, and wherein generating the plurality of nodes and the plurality of edges is based on the one or more entries in the document-oriented database.

21. A non-transitory computer readable storage medium having stored thereon a set of instructions for assessing a computer network using a graph database that when executed by a computing device, cause the computing device to:
receive data from a plurality of network sensors and convert the received data to a common format, wherein the received data is based on a present state of a computer network;
generate a graph model comprising a plurality of nodes and a plurality of edges based on the data converted to the common format and store the generated plurality of nodes and the plurality of edges within a graph database, wherein the graph model comprises a plurality of predetermined layers, each layer associated with a type of computer-network information and comprising a subset of the plurality of nodes and the plurality of edges that is generated from the received data supplying the type of computer-network information associated with that layer;
receive a cyber-domain specific data query from a user;
convert the received cyber-domain specific data query to a graph database native query comprising function calls for returning corresponding matching subgraphs from the plurality of predetermined layers of the graph model; and
execute the graph database native query upon the graph database to provide the user with a visualization of the returned matching subgraphs from across the predetermined layers of the graph model.

22. The non-transitory computer readable storage medium of claim 21, wherein a layer of the plurality of predetermined layers comprise a subset of the generated plurality of nodes and a subset of the plurality of edges that convey information about a mission readiness state of the computer network.

23. The non-transitory computer readable storage medium of claim 22, wherein at least one node and at least one edge of the plurality of nodes and plurality of edges convey information about a mission objective of the computing network.

24. The non-transitory computer readable storage medium of claim 23, wherein at least one node and at least one edge of the plurality of nodes and plurality of edges convey information about a task of the computing network, wherein the task is based on the mission objective of the computing network.

25. The non-transitory computer readable storage medium of claim 24, wherein at least one node and at least one edge of the plurality of nodes and plurality of edges convey information about an information asset of the computing network, wherein the information asset is based on the task of the computing network.

26. The non-transitory computer readable storage medium of claim 23, wherein at least one node and at least one edge of the plurality of nodes and plurality of edges convey information about a cyber asset of the computing network, wherein the cyber asset is based on the information asset of the computing network.

27. The non-transitory computer readable storage medium of claim 21, wherein a layer of the plurality of predetermined layers comprise one or more nodes and one or more edges that convey information about potential cyber threats to the computer network.

28. The non-transitory computer readable storage medium of claim 21, wherein a layer of the plurality of predetermined layers comprise one or more nodes and one or more edges that convey information about a cyber posture of the computer network.

29. The non-transitory computer readable storage medium of claim 21, wherein a layer of the plurality of predetermined layers comprise one or more nodes and one or more edges that convey information about an infrastructure of the computer network.

30. The non-transitory computer readable storage medium of claim 21, wherein the computing device is further caused to:
receive the data from the plurality of sensors and convert the received data into one or more entries in a document-oriented database, and wherein generating the plurality of nodes and the plurality of edges is based on the one or more entries in the document-oriented database.

* * * * *